Patented June 21, 1949

2,474,019

UNITED STATES PATENT OFFICE 2,474,019

STABILIZER FOR ICINGS

Arnold B. Steiner, La Jolla, and Lloyd B. Rothe, San Diego, Calif., assignors to Kelco Company, San Diego, Calif., a corporation of Delaware No Drawing. Application March 10, 1947, Serial No. 733,732

30 Claims. (Cl. 99—139)

This invention relates to improvements in the manufacture of the types of icings used in bakeries, and specifically to an emulsifying and stabilizing composition by which the desired properties of such icings are materially improved.

An object of the invention is to produce an icing of improved texture and appearance, which is more pliable than a similar icing to which the composition has not been added and which, in consequence, is easier to apply to bakery products.

An object of the invention is to bring a batch of icing to a desired increased volume in a shorter time than has heretofore been possible.

An object of the invention is to produce an icing having an enhanced drying rate and which remains stable to changes in atmospheric temperature and himidity.

The basic ingredients of all icings are sugar and water, though other materials such as fats and shortenings, egg whites, flour, skim milk powder, chocolate and flavorings are often added. Icings consisting chiefly of egg whites and sugars are known as meringues and certain other special icings are known as topping.

In the manufacture of icing for commercial use it is customary to add a small proportion, of the order of 0.5% by weight, of a stabilizer such as a gel-forming algin compound. The purpose of this addition is to reduce the stickiness of the icing and to prevent melting and running after the icing is applied.

An algin stabilizer of this type may be a mixture of a soluble salt of alginic acid with a substantially insoluble alginate, as for example a mixture of ammonium alginate and calcium alginate. A similar gel-forming alginic stabilizing compound may be made by mixing a soluble alginate with a substantially insoluble metallic salt whose cation will gel or precipitate the algin, as for example ammonium or sodium alginate with calcium citrate or calcium phosphate. Buffer salts such as the sodium phosphates may be added to these compounds to control the rate of gelling of the soluble alignate. Other water-soluble alginates may be used, to-wit, the alkali metal alginates or magnesium alginate, and these may be used alone or in a gel-forming composition, the latter alternative being preferred.

We have discovered that the properties of any given icing may be improved as regards ease of handling and of application to the cake, and in the other respects above set forth, by adding to the icing, in admixture with the algin stabilizer above described, a suitable surface active agent. This agent may be a mixture of the mono- and diglycerides of the higher fatty acids as the sulfoacetates thereof, or a mixture of the sorbitan esters of the higher fatty acids with the polyoxyethylene derivatives of such esters, or one or a mixture of the polyoxyethylene derivatives of stearic acid.

The mixture of sulfoacetates of the mono- and diglycerides of the higher fatty acids is that prepared according to the disclosures of United States Patents 2,166,142, 2,166,143 and 2,166,145 to Benjamin R. Harris. The preferred process of manufacture described in these patents comprises reacting one or more free hydroxy groups of a polyhydroxy substance such as glycerol or a derivative thereof, with a halogeno-carboxylic acid such as chloracetic or bromacetic acid, or with a halogeno-carboxylic acid halide, such as chloracetyl chloride or brom-acetyl chloride, to form a chloracetate or bromacetate, and converting this product to the sulfonic acid derivative by reaction with an alkali metal sulfite. An example of this would be the sodium salt of monostearin sulfoacetate, which is prepared by reacting monostearin with chloracetic acid and converting the reaction product with the use of sodium sulfite, some distearin sulfoacetate being formed in the reaction as the sodium salt. A commercial product of this type is known in the trade as "Emargol," a white paste containing about 50% water, which can be eliminated if desired to give a waxy solid.

The formation of the fatty acid esters of sorbitan (known commercially as the "Spans") is disclosed in United States Patents 2,322,820 and 2,322,821, consisting briefly in reacting the desired fatty acid with sorbital anhydride. The fatty acids used are those containing from twelve to eighteen carbon atoms, such as lauric, palmitic, stearic and oleic acids.

The polyoxyethylene derivatives of the sorbitan esters (known commercially as the "Tweens") are prepared by reacting one mole of one of the fatty acid esters of sorbitol anhydride with from ten to thirty moles of ethylene oxide, as described in United States Patent 2,380,166.

The polyoxyethylene derivatives of stearic acid are readily prepared by reacting one mole of stearic acid of commercial purity with from ten to fifty moles of ethylene oxide or with a corresponding polyethylene glycol. These products are waxy solids, fusible at relatively low temperatures and soluble or dispersible in water.

In the use of the sorbitan esters it is preferable to mix these esters with their polyoxyethylene derivatives or with the polyoxyethylene derivatives of stearic acid to obtain the maximum benefit in connection with the colloidal stabilizer. While these derivatives are, generally speaking, soluble or dispersible in water, the sorbitan esters are insoluble and only dispersible, and it is thought that the improved results given by mixtures of these two types of compound may be due to the difference in solubility. A preferred mixture is two parts of sorbitan stearate with one part of the polyoxyethylene derivative of sorbitan monopalmitate; another a mixture of equal parts of sorbitan monopalmitate and its polyoxyethylene derivative or the polyoxyethylene derivative of stearic acid.

The above described surface active agents at normal temperature are oily liquids or readily fusible waxy solids and it is desirable to add a finely powdered drying agent when blending them with the dry powdered stabilizer. Dextrin or flour is suitable for this purpose, a desirable proportion of this agent being from 10% to 20% of the weight of the blend. The surface active agent, in the liquid phase, may be mixed with the drying agent and this mixture blended with the powdered stabilizer, or the procedure may be reversed, the molten or already liquid surface active agent being mixed with the stabilizer and the drying agent then added and the whole thoroughly blended. The latter procedure is preferred as it renders the drying agent particularly effective in coating the oily surfaces of the particles of stabilizer and tends to prevent caking in transit or storage. As the drying agent is a food product and entirely inert as regards stabilization it may be used in any quantity required to maintain the finished blend in the form of discrete particles, due allowance being made for the inert matter in calculating the unit stabilizing value of the final product.

The stabilizing ingredient above described as a water-soluble alginic salt or a self-gelatinizing combination of such salt with a salt supplying precipitating ions, may be substituted by any edible hydrophilic colloid, all of these substances having stabilizing properties developed to different degrees. Examples of such colloids are agar-agar, Irish moss, gelatin, gum karaya, locust bean gum and sodium carboxymethyl cellulose. The effectiveness of agar-agar is approximately equal to that of sodium alginate while a 200 Bloom gelatin is about one-half as effective as an equal weight of algin.

The gelatinizing reaction with calcium and similar salts is peculiar to the alginates and the other colloids named are used as such, not in the form of a self-gelatinizing combination.

In formulating the icing additive with the use of various alternatives as to stabilizing component and surface active agent, considerable latitude is permissible as an excess of any component is wasteful rather than harmful. It is possible, however, to formulate the additive with some approach to accuracy by taking into consideration the relative stabilizing efficiencies of algin, agar-agar and gelatin as above stated, the relative emulsifying values of two groups of surface active agents, and the quantity of any one of the stabilizers and any one of the surface active agents required to produce the most economical result in any given case.

The sulfoacetates of the glycerides are usually about one and one-half times as effective as the sorbitan esters and the various polyoxyethylene derivatives, and the optimum relation of the esters to the derivatives, when used together, ranges from 1:1 to 2:1. Finally, the optimum stabilization is produced with about 1.2% of the algin based on the water content of the icing, or an equivalent quantity of another colloid, and the optimum relation of surface active agent to water is about 0.40% for the glycerides and about 0.60% for the other surface active agents.

Examples of such compositions could be multiplied indefinitely, the following being illustrative only. In these examples the first figure in each line shows the percentage relation of the component to the water of formulation of the icing, the second the percentage relation of the component to the total dry weight of the additive.

*Example 1*

| | Per cent |
|---|---|
| Alginate or agar-agar stabilizer | 1.20=60 |
| Sorbitan monostearate | 0.40=20 |
| Polyoxyethylene derivative of sorbitan monopalmitate | 0.20=10 |
| Drying agent | 0.20=10 |

*Example 2*

| | Per cent |
|---|---|
| Alginate or agar-agar stabilizer | 1.20=60 |
| Sorbitan monopalmitate | 0.30=15 |
| Polyoxyethylene deriavtive of sorbitan monopalmitate | 0.30=15 |
| Drying agent | 0.20=10 |

*Example 3*

| | Per cent |
|---|---|
| Alginate or agar-agar stabilizer | 1.20=60 |
| Mixture mono- and diglycerides as sulfoacetates, sodium salt | 0.40=20 |
| Drying agent | 0.40=20 |

*Example 4*

| | Per cent |
|---|---|
| Alginate or agar-agar stabilizer | 1.20=60 |
| Sodium salt of monostearin sulfoacetate | 0.40=20 |
| Drying agent | 0.40=20 |

*Example 5*

| | Per cent |
|---|---|
| Sodium alginate | 1.20=60 |
| Polyoxyethylene derivative of stearic acid | 0.30=15 |
| Sorbitan monopalmitate | 0.30=15 |
| Drying agent | 0.20=10 |

*Example 6*

| | Per cent |
|---|---|
| Gelatin stabilizer | 2.40=75 |
| Sorbitan monostearate | 0.40=12.5 |
| Polyoxyethylene derivative of sorbitan monopalmitate | 0.20=6.25 |
| Drying agent | 0.20=6.25 |

*Example 7*

| | Per cent |
|---|---|
| Gelatin stabilizer | 2.40=75 |
| Sorbitan monostearate | 0.40=12.5 |
| Polyoxyethylene derivative of stearic acid | 0.20=6.25 |
| Drying agent | 0.20=6.25 |

*Example 8*

| | Per cent |
|---|---|
| Gelatin stabilizer | 2.40=75 |
| Mixture mono- and diglycerides as sulfoacetates, sodium salt | 0.40=12.5 |
| Drying agent | 0.40=12.5 |

The combination stabilizer herein described may be used to great advantage in icings which are whipped to increase their volume, as for example an icing having the following formula in percents by weight:

| | Percent |
|---|---|
| Sugar | 73.00 |
| Flour | 7.00 |
| Stabilizer | 0.45 |
| Water | 19.55 |

When the simple alginate stabilizer was used in this formula, whipping for fourteen minutes increased the volume by only 4%. When the new combination stabilizer was substituted in the same formula, an increase in volume of 30% was obtained in one minute whipping, and an increase of 90% in four minutes. This is an important advantage in icings of this type.

The novel combination stabilizer is also highly useful in icings of the fat type, as for example in the formula following:

| | Percent |
|---|---|
| Sugar | 71.5 |
| Water | 13.3 |
| Stabilizer | 0.3 |
| Shortening | 14.3 |
| Salt | 0.2 |
| Flavoring | 0.4 |

When the simple alginate stabilizer is used in formulae of this type, the resultant icing is likely to be dull in appearance, and sometimes the fat tends to coalesce and separate from the icing on standing. When the new stabilizer is substituted, the fat particles are efficiently dispersed, the icing presents a uniform glossy appearance, and separation of the fat is inhibited.

Egg whites are often used to produce an icing having a light, tender body and which whips well to form an icing of the meringue type, as for example in the following formula:

| | Percent |
|---|---|
| Sugar | 71.7 |
| Stabilizer | 1.0 |
| Water | 19.8 |
| Egg white liquid | 7.5 | the stabilizer in this formula being the simple alginate stabilizer. When the new combination stabilizer is substituted the proportion of egg white required is reduced by two-thirds, the formula becoming:

| | Percent |
|---|---|
| Sugar | 75.5 |
| Stabilizer | 1.1 |
| Water | 20.8 |
| Egg white liquid | 2.6 |

A further advantage in the use of the new stabilizer in icings of this type is that it eliminates the stickiness and the slow drying which heretofore have obtained in the use of egg whites.

The new stabilizer has several advantages over those heretofore used which are realized in the making and use of icings of all types. First, the icing made by any given formula is much thinner than when the simple colloid stabilizer is used, the consistency being reduced from that of a paste to that of a liquid. This permits the icing to be applied more readily, by hand or machine, and it is possible to prepare an icing of such low viscosity as to permit it to be used in a spray machine without loss of stability.

The new combination stabilizer is much more readily incorporated in the icing than the simple colloid stabilizers, the surface active agent assisting in dispersing the colloid component in the aqueous liquid, increasing the speed of solution and avoiding any tendency to clump.

Icings made with the new stabilizer are highly appetizing in appearance, the whiteness of the applied layer being promoted by the incorporation of air in the form of small and uniform air cells.

Finally, the drying time of the applied icing is reduced to an important degree by the use of the new stabilizer. Comparative trials on a commercial scale have shown that under conditions in which an icing stabilized with a simple alginate stabilizer requires about ten minutes to dry, the same icing made with the use of the new stabilizer dries in from three to five minutes. This accelerated drying is important in large scale operation in facilitating handling and wrapping of the finished product without danger of the icing sticking to the wrapper.

We claim as our invention:

1. An additive for bakery icings, comprising: an edible hydrophilic colloid together with a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

2. An additive for bakery icings, comprising: an edible, water-soluble alginate together with a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

3. An additive for bakery icings, comprising: an edible, water-soluble alginate; a substantially water-insoluble calcium salt, and a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

4. An additive for bakery icings, comprising: an edible hydrophilic colloid together with the sodium salt of monostearin sulfoacetate.

5. An additive for bakery icings, comprising: an edible water-soluble salt of alginic acid together with the sodium salt of monostearin sulfoacetate.

6. An additive for bakery icings, comprising: an edible water-soluble salt of alginic acid; a substantially water-insoluble calcium salt; and the sodium salt of monostearin sulfoacetate.

7. An icing for cakes and the like characterized by the presence of small but effective quantities of an edible hydrophilic colloid and of a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

8. An icing for cakes and the like characterized by the presence of small but effective quantities of an edible water-soluble alginate and of a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

9. An icing for cakes and the like characterized by the presence of small but effective quantities of an edible, water-soluble alginate; a substantially water-insoluble calcium salt, and a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

10. An icing for cakes and the like characterized by the presence of small but effective quantities of an edible hydrophilic colloid and of the sodium salt of monostearin sulfoacetate.

11. An icing for cakes and the like characterized by the presence of small but effective quantities of an edible water-soluble salt of alginic acid, of a substantially water-insoluble calcium salt, and of the sodium salt of monostearin sulfoacetate.

12. An additive for bakery icings, comprising: an edible water-soluble salt of alginic acid, calcium alginate, and the sodium salt of monostearin sulfoacetate.

13. An additive for bakery icings, comprising: agar-agar together with a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

14. An additive for bakery icings, comprising: gelatin together with a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

15. An additive for bakery icings, comprising: an edible hydrophilic colloid together with a sorbitan ester of a higher fatty acid and a polyoxyethylene derivative of a sorbitan ester of a higher fatty acid.

16. An additive for bakery icings, comprising: an edible hydrophilic colloid together with a sorbitan ester of a higher fatty acid and a polyoxyethylene derivative of stearic acid.

17. An additive for bakery icings, comprising: an edible water-soluble salt of alginic acid together with a sorbitan ester of a higher fatty acid and a polyoxyethylene derivative of a sorbitan ester of a higher fatty acid.

18. An additive for bakery icings, comprising: an edible water-soluble salt of alginic acid together with a sorbitan ester of a higher fatty acid and a polyoxyethylene derivative of stearic acid.

19. An additive for bakery icings, comprising: agar-agar together with a sorbitan ester of a higher fatty acid and a polyoxyethylene derivative of a sorbitan ester of a higher fatty acid.

20. An additive for bakery icings, comprising: agar-agar together with a sorbitan ester of a higher fatty acid and a polyoxyethylene derivative of stearic acid.

21. An additive for bakery icings, comprising: agar-agar together with the sodium salt of monostearin sulfoacetate.

22. An additive for bakery icings, comprising: gelatin together with a sorbitan ester of a higher fatty acid and a polyoxyethylene derivative of a sorbitan ester of a higher fatty acid.

23. An additive for bakery icings, comprising: gelatin together with a sorbitan ester of a higher fatty acid and a polyoxyethylene derivative of stearic acid.

24. An additive for bakery icings, comprising: gelatin together with the sodium salt of monostearin sulfoacetate.

25. An additive for bakery icings, comprising: an edible water-soluble salt of alginic acid; a substantially water-insoluble calcium salt; a sorbitan ester of a higher fatty acid, and a polyoxyethylene derivative of a sorbitan ester of a higher fatty acid.

26. An additive for bakery icings, comprising: an edible water-soluble salt of alginic acid; a substantially water-insoluble calcium salt; a sorbitan ester of a higher fatty acid, and a polyoxyethylene derivative of stearic acid.

27. An icing for cakes and the like characterized by the presence of small but effective quantities of agar-agar and of a surface active agent selected from the group consisting of the sorbitan esters of the higher fatty acids, the polyoxyethylene derivatives of said esters and of stearic acid, and the sodium sulfoacetates of the mono- and diglycerides of the higher fatty acids.

28. An icing for cakes and the like characterized by the presence of small but effective quantities of gelatin and of a surface active agent selected from the group consisting of the sorbitan esters of the higher fatty acids, the polyoxyethylene derivatives of said esters and of stearic acid, the sodium sulfoacetates of the mono- and diglycerides of the higher fatty acids.

29. An icing for cakes and the like characterized by the presence of small but effective quantities of agar-agar and of the sodium salt of monostearin sulfoacetate.

30. An icing for cakes and the like characterized by the presence of small but effective quantities of gelatin and of the sodium salt of monostearin sulfoacetate.

ARNOLD B. STEINER.
LLOYD B. ROTHE.

REFERENCES CITED

The following references are of record in the file of this patent:

UNITED STATES PATENTS

| Number | Name | Date |
|---|---|---|
| 2,399,195 | Bodenheim | Apr. 30, 1946 |
| 2,422,486 | Johnston | June 17, 1947 |